United States Patent
Wallaszkovits et al.

(10) Patent No.: US 9,375,883 B2
(45) Date of Patent: Jun. 28, 2016

(54) METHOD FOR RECONDITIONING DATA CARRIERS

(75) Inventors: Nadja Wallaszkovits, Neufeld (AT); Peter Liepert, Vienna (AT); Lidija Spoljaric-Lukacic, Vienna (AT)

(73) Assignee: ÖSTERREICHISCHE AKADEMIE DER WISSENSCHAFTEN, Vienna (AT)

( * ) Notice: Subject to any disclaimer, the term of this patent is extended or adjusted under 35 U.S.C. 154(b) by 0 days.

(21) Appl. No.: 13/997,102

(22) PCT Filed: Dec. 23, 2011

(86) PCT No.: PCT/AT2011/000516
§ 371 (c)(1),
(2), (4) Date: Sep. 13, 2013

(87) PCT Pub. No.: WO2012/088553
PCT Pub. Date: Jul. 5, 2012

(65) Prior Publication Data
US 2014/0070436 A1 Mar. 13, 2014

(30) Foreign Application Priority Data
Dec. 23, 2010 (AT) .................... 2124/2010

(51) Int. Cl.
*B29C 73/02* (2006.01)
*G03D 15/00* (2006.01)
*G11B 23/50* (2006.01)

(52) U.S. Cl.
CPC ............... *B29C 73/02* (2013.01); *G03D 15/00* (2013.01); *G11B 23/502* (2013.01)

(58) Field of Classification Search
CPC ....... B29C 73/02; G03D 15/00; G11B 23/502
USPC .................. 264/1.1, 2.6, 36.1, 341, 340, 343
See application file for complete search history.

(56) References Cited

U.S. PATENT DOCUMENTS

| 5,011,620 | A | * | 4/1991 | Dishart et al. ................. 510/175 |
| 5,661,209 | A | * | 8/1997 | Beers et al. .................... 524/476 |
| 6,969,581 | B1 | | 11/2005 | Wagner |
| 2004/0121927 | A1 | * | 6/2004 | McDonald ..................... 510/245 |
| 2004/0183052 | A1 | * | 9/2004 | Miller ............................ 252/381 |

FOREIGN PATENT DOCUMENTS

| DE | 421863 | 11/1925 |
| GB | 486360 | 6/1938 |
| GB | 499306 | 1/1939 |

OTHER PUBLICATIONS

International Search Report issued by the European Patent Office in International Application PCT/AT2011/000516 on Apr. 20, 2012.

* cited by examiner

*Primary Examiner* — Mathieu Vargot
(74) *Attorney, Agent, or Firm* — Henry M. Feiereisen LLC

(57) ABSTRACT

In a method for reconditioning data carriers having a plastic part, a reconditioning fluid is applied in a liquid phase to the data carrier, wherein the reconditioning fluid includes at least one solvent and at least one plasticizer, wherein the solvent is selected in such a way that it is substantially inert compared to the data carrier, wherein a non-volatile plasticizer is selected and the concentration of the plasticizer in the reconditioning fluid is selected such that the gradient of the change in volume of the data carrier owing to the replacement of plasticizer with the reconditioning fluid is positive.

16 Claims, 1 Drawing Sheet

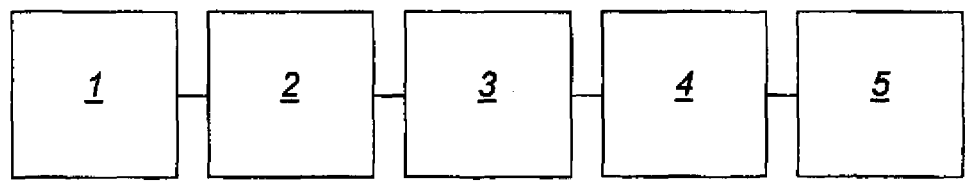

METHOD FOR RECONDITIONING DATA CARRIERS

CROSS REFERENCE TO RELATED APPLICATIONS

This application is the U.S. National Stage of International Application No. PCT/AT2011/000516, filed Dec. 23, 2011, which designated the United States and has been published as International Publication No. WO 2012/088553 A8 and which claims the priority of Austrian Patent Application, Ser. No. 2124/2010, filed Dec. 23, 2010, pursuant to 35 U.S.C. 119(a)-(d).

BACKGROUND OF THE INVENTION

The invention relates a method for reconditioning data carriers having a plastic content.

Data carriers are known, especially film carriers or sound carriers, which have a plastic content. Such film or sound carriers come with the disadvantage that their properties, especially their mechanical ones, will deteriorate over time. This deterioration in their properties can lead to the consequence that a film or sound carrier that is wound up on a reel or spool can no longer be unreeled in a destruction-free manner.

Although methods are known for the reconditioning of data carriers with a plastic content, in which the data carrier will be subjected to a vapor consisting of water, acetone and/or volatile plasticizers over a longer period of time, it was noticed however that the achieved reconditioning such as the improvement in the mechanical properties of the data carrier was often only of short duration.

SUMMARY OF THE INVENTION

It is therefore the object of the invention to provide a method of the kind mentioned above with which the mentioned disadvantages can be avoided and with which a durable reconditioning of the data carrier can be achieved.

This is achieved in accordance with the invention by a method for reconditioning data carriers having a plastic content, including applying a reconditioning liquid in liquid phase to the data carrier, wherein the reconditioning liquid includes at least one solvent and at least one non-volatile plasticizer, wherein the solvent is substantially inert in relation to the data carrier, wherein a concentration of the plasticizer in the reconditioning liquid is such that a gradient of change in volume of the data carrier is positive as a result of an exchange of the plasticizer with the reconditioning liquid.

As a result, a durable reconditioning of the data carrier can be achieved. The method in accordance with the invention not only allows reclaiming the information of the data carrier, but can also improve the further storing capabilities of the treated to data carrier. Consequently, the data carrier can not only be read and copied but can also be stored as an original document for further years in a secure manner. Furthermore, a strip- or tape-like data carrier such as a film strip or sound tape, which is wound up on a reel and in which individual layers are already meshed into each other prior to the treatment in such a way that even the attempt of a mechanical separation or unreeling would lead to a damage of the data carrier, can be easily unreeled again. The mechanical loading capability of the strip- or tape-like data carrier will thus be further improved in such a way that it can be processed by a tape machine or copying machine without being damaged. Consequently, the reproduction quality especially of high-frequency contents such as the upper harmonics in sound recordings or fine picture details in photographic contents can be improved considerably. It was further noticed that the effects of the so-called vinegar syndrome in which a data carrier comprising cellulose acetate decomposes under release of acetic acid can advantageously be combated in a data carrier. Recordings of cultural creations and historic events that were currently regarded as irreplaceably lost can be read and played again. The method in accordance with the invention allows saving relevant parts of the cultural heritage of humanity from irreplaceable loss and securing them for future generations.

Reference is hereby made expressly to the phrasing of the claims, as a result of which the claims shall apply here as inserted by reference into the description and as reproduced literally.

The invention will be explained in closer detail by reference to the enclosed drawing, in which merely one preferred embodiment is shown by way of example. The only drawing shows a preferred embodiment of a method for reconditioning data carriers having a plastic content in form of a flowchart.

The only drawing shows a preferred embodiment of a method for reconditioning data carriers with a plastic content, wherein a reconditioning liquid in liquid phase is applied to the data carrier, wherein the reconditioning liquid comprises at least one solvent and at least one plasticizer, that the solvent is selected in such a way that it is substantially inert in relation to the data carrier, that a non-volatile plasticizer is selected, and the concentration of the plasticizer in the reconditioning liquid is selected in such a way that the gradient of the change in volume of the data carrier is positive owing to the exchange of the plasticizer with the reconditioning liquid.

As a result, a durable reconditioning of the data carrier can be achieved. The method in accordance with the invention not only allows reclaiming the information of the data carrier, but can also improve the further storing capabilities of the treated to data carrier. Consequently, the data carrier can not only be read and copied but can also be stored as an original document for further years in a secure manner. Furthermore, a strip- or tape-like data carrier such as a film strip or sound tape which is wound up on a reel and in which individual layers are already meshed into each other prior to the treatment such that even the attempt of a mechanical separation or unreeling would lead to a damage of the data carrier can be easily unreeled again. The mechanical loading capability of the strip- or tape-like data carrier will thus be further improved in such a way that it can be processed by a tape machine or copying machine without being damaged. Consequently, the reproduction quality especially of high-frequency contents such as the upper harmonics in sound recordings or fine picture details in photographic contents can be improved considerably. It was further noticed that the effects of the so-called vinegar syndrome in which a data carrier comprising cellulose acetate decomposes under release of acetic acid can advantageously be combated in a data carrier. Recordings of cultural creations and historic events that were currently regarded as irreplaceably lost can be read and played again. The method in accordance with the invention allows saving relevant parts of the cultural heritage of humanity from irreplaceable loss and securing them for future generations.

Reconditioning of a data carrier shall mean within the terms of the invention that the properties of the data carrier, preferably the mechanical properties such as elasticity and/or extensibility, can be improved. Reconditioning of a data carrier shall further mean within the terms of the invention that the volume of the plastic content of the data carrier will be increased. In the general sense reconditioning of a data carrier shall mean within the terms of the invention that the readability or copying capability of the information contained on the data carrier will be improved or recovered.

The method is provided for reconditioning data carriers having a plastic content.

The plastic content can especially be made of plastic.

Materials such as cellulose acetate, mixed cellulose ester, polyvinyl chloride (PVC), polyethylene terephthalate (PET), biaxially oriented polyethylene terephthalate (boPET, Mylar), and/or polyethylene naphthalate can be used as the plastic content.

The data carriers usually comprise an information layer which contains the information and a carrier layer which mainly determines the mechanical properties of the data carrier. The information layer and/or the carrier layer can contain a plastic content. Data carriers are known for example whose information layer and carrier layer comprise a plastic content, e.g. sound tapes. In the case of sound tapes, the carrier layer and the information layer usually comprise a plastic content, wherein the information layer usually additionally comprises magnetizable particles.

Furthermore, data carriers are known in which merely the carrier layer has a plastic content, e.g. films in which the information layer is arranged as a photo emulsion.

Data carriers are also known in which merely the information layer has a plastic content such as a lacquer disc in which the information layer is made of cellulose lacquer or acrylic lacquer and the carrier layer of metal, glass or cardboard.

Data carriers are often arranged in a strip-like or tape-like manner, wherein they can be rolled up on a reel or spool and can also be played back easily.

A method is preferably provided that uses tape material as a data carrier, preferably with an information layer comprising magnetizable particles.

A plasticizer will usually be added to the plastic content of the data carrier in order to achieve improved deformation capabilities, increased elastic properties and/or lower hardness. Such plasticizers usually do not enter into any chemical compound with the plastic content. A plasticizer will swell the plastic content to which it was added to a certain extent.

Since such plasticizers have a certain amount of volatility, a reduction in the concentration of the plasticizer in the plastic content occurs with increasing age of the data carrier since the plasticizer will evaporate and/or escape over time.

This decrease in the concentration of the plasticizer has a negative effect in different ways. For example, a deterioration in the mechanical properties of the plastic content such as elasticity or extensibility occurs as a result of the decrease of the concentration of the plasticizer in the plastic content.

Furthermore, the loss of plasticizer leads to a reduction in the volume of the plastic content. A further disadvantage that occurs as a result of shrinkage is that many data carriers such as a 35 mm film comprises perforations for guidance in a machine such as a playback apparatus or a copying machine, the distance of which will change as a result of the shrinkage of the plastic component, so that the data carrier can only be used in expensive special machines which can also work with changed perforation distances.

Since data carriers usually comprise at least two different layers which further usually strongly shrink over time to different extents, warpage and/or bulging of the data carrier occurs by evaporation of the plasticizer.

This can lead to strong mechanical meshing of a strip-like or tape-like data carrier wound up on a reel, which subsequently can prevent destruction-free unreeling or unspooling of the tape from the reel. This prevention of unreeling or unspooling is especially problematic because other methods for saving the information contained in the film strip or sound tape such as the copying of the information on to another data carrier are also no longer possible.

It is provided according to the method that a reconditioning liquid is applied in liquid phase to the data carrier, wherein the reconditioning liquid comprises at least one solvent and at least one plasticizer. A reconditioning liquid in liquid phase shall mean within the terms of the invention that both the solvent and also the plasticizer are in liquid phase during the application onto the data carrier. Since the plasticizer will be applied in liquid phase, a plasticizer can be chosen which has a low vapor pressure. Because the reconditioning liquid is applied in liquid phase to the data carrier, the reconditioning liquid can act upon the data carrier in an especially deep way, as a result of which even reeled data carriers can be treated effectively.

It is provided in the method that the solvent is chosen such a way that it is substantially inert in relation to the data carrier. Inert within the terms of the invention shall mean that the solvent does not enter into any chemical compound with the data carrier, and/or will not diffuse into the data carrier and the data carrier will thus not swell. Substantially inert within the terms of the invention shall especially mean that the solvent enters into a chemical compound with the data carrier which is not irrelevant or negligible, and/or will not diffuse into the data carrier and the data carrier will thus not swell. The data carrier can therefore remain for a long period of time in the solvent without forming any disadvantageous changes in the data carrier. The method will therefore become less complex and less susceptible to errors.

The solvent can especially also be arranged as a liquid mixture. Since the solvent is substantially inert, the reconditioning liquid is therefore free from non-inert solvent components, i.e. swelling or decomposing components such that react with the data carrier. It can especially further be provided that the reconditioning liquid comprises a plasticizer.

It can further be preferably provided that the solvent is chosen in such a way that it will not negatively influence or even release any glued connections of the data carrier.

It is preferably provided that a non-explosive solvent is used. Non-explosive within the terms of the invention shall mean that the flashpoint of the solvent lies over 40° C., especially over 55° C., and more preferably over 61° C. Inflammation of the solvent at a conventional process temperature can be prevented in this manner. The method can therefore be performed with little effort by staff that has undergone little training. Furthermore, the likelihood of a destruction of a data carrier during the method by explosion or sudden inflammation will be reduced. As a result of a high flashpoint of the solvent, further safety regulations during transport and/or storage of the solvent can be avoided, thereby further reducing the entire workload of the method.

It is preferably further provided that a solvent with a flashpoint of less than 70° C. is used. The solvent can consequently evaporate rapidly, so that the total duration of the method will remain low.

It is further preferably provided that a non-toxic solvent will be used. Non-toxic within the terms of the invention shall mean that the $LD_{50}$ in oral intake by a rat is higher than 2000 mg/kg. As a result, complex precautionary measures in performing the method and/or during transport and/or during storage of the solvent can be avoided. The method can consequently be performed by staff that has undergone a low amount of training. Furthermore, the use of a non-toxic solvent is advantageous within the terms of environmental protection.

It is further preferably provided that dearomatized hydrocarbons are used as the solvent.

Saturated hydrocarbons which are liquid in performing the method such as isoparaffin or liquids comprising paraffins and/or naphthenes (such a preferred liquid mixture is known under the trade name Shellsol D40 or Sheilsol D60) can be used as solvents for example.

The method will preferably be performed in a temperature range of between 10° C. and a temperature which is 5° C. lower than the flashpoint of the reconditioning liquid and a pressure range of between 600 mbars and 1200 mbars, preferably approx. 1 bar, wherein the temperature at which the method is performed lies over flashpoint of the used solvent. As a result, it is not necessary to check the temperature or the pressure during the performance of the method, as a result of which the method in accordance with the invention can be performed with little effort on appliances, so that the method will use resources within limits and show low susceptibility to errors.

It is further provided in the method that a non-volatile plasticizer is chosen. Non-volatile within the terms of the invention shall mean that the plasticizer has such a high vapor pressure and that the concentration of the plasticizer in the plastic content will decrease relatively in 100 years only by 10% under normal storage conditions. As a result, renewed evaporation of plasticizer from the plastic content will be prevented, by means of which the reconditioning achieved by the method is durable. As a result, data carriers reconditioned by the method can be stored again as the original for a longer period of time.

The plasticizer can be chosen such a way that the mixture of solvent and the plasticizer leads to a solution or an emulsion, and/or the mixture of solvent and plasticizer is only achieved by the addition of an emulsifier.

It can preferably be provided however that the plasticizer is chosen in such a way that it can be mixed in a homogeneous manner with the solvent. The addition of an emulsifier can be avoided thereby. Furthermore, a homogeneous concentration of the plasticizer in the solvent is achieved by the homogeneous miscibility of the solvent and the plasticizer.

Phosphoric ester and/or phthalic ester, especially dibutyl phthalate, Di-2-ethylhexyl phthalate and/or triphenyl phosphate can be used as the plasticizer.

If only environmentally compatible plasticizers may or should be used, 1,2-cyclohexane dicarboxylic acid diisononyl ester and/or ester of adipic acid can also be used as a plasticizer. This allows fulfilling the increasingly stringent environmental regulations in the industrial states on the one hand, and the method in accordance with the invention can also be performed in an environmentally compatible manner in countries where waste disposal is not yet highly developed.

It is provided in the method that the concentration of the plasticizer in the reconditioning liquid will be chosen in such a way that the gradient of the change in volume of the data carrier will be chosen in such a way that the gradient of the change in volume of the data carrier will be positive as a result of the exchange of the plasticizer with the reconditioning liquid.

This exchange of plasticizer with the reconditioning liquid can be arranged as an enrichment of the plasticizer in the data carrier, especially in the plastic content of the data carrier.

A positive gradient of the change in volume of the data carrier means within the terms of the invention that the exchange of plasticizers between the plastic content of the data carrier and the reconditioning liquid leads to an increase in the total volume of the plasticizer in the plastic content. The plastic content of the data carrier can especially be swelled subsequently in this manner.

The exchange of plasticizer between the plastic content and the reconditioning liquid occurs predominantly by a diffusion process. As a result, plasticizers will diffuse both from the reconditioning liquid into the plastic content and also from the plastic content into the reconditioning liquid.

It can especially be provided that the plasticizer is exchanged between the plastic content and the reconditioning liquid mainly by a diffusion process.

Furthermore, a plasticizer other than the one already situated in the plastic content of the data carrier can be used. This not only allows increasing the concentration of the plasticizer in the plastic content of the data carrier, but the old plasticizer in the plastic content of the data carrier can be replaced by another one which is less volatile and/or toxic for example.

The plasticizer penetrating the plastic content can further displace substances from the plastic content which can have a negative effect on the plastic content and therefore on the data carrier. Such substances can be water and/or acetic acid in the data carrier, comprising cellulose acetate or mixed cellulose acetate ester, which substances promote the vinegar syndrome and therefore the destruction of the data carrier.

Preferably, a low concentration of the plasticizer is chosen in the reconditioning liquid. An excessively large concentration gradient of the plasticizer in the interior of plastic content of the data carrier can be prevented. Furthermore, this leads to a slower increase in the plasticizer concentration of the plastic content of the data carrier, thus making the method less susceptible to errors.

Preferably, a concentration of the plasticizer of less than 10% is chosen in the reconditioning liquid.

The reconditioning liquid can be applied in different ways in liquid phase to the data carrier.

It can preferably be provided that the data carrier is dipped into the reconditioning liquid. The reconditioning liquid can be applied to the data carrier in this way in a careful and simple manner.

The data carrier can be drawn through the reconditioning liquid in this process.

The data carrier will preferably be immersed completely into the reconditioning liquid. As a result, the method can be performed with few workers and little material effort.

It can be provided in a further development of the invention that the data carrier is placed during complete immersion into the reconditioning liquid onto a support element, especially a rack, preferably a grating, in order to prevent contamination of the data carrier by falling suspended matter which would negatively influence the reproduction quality of the data carrier. Consequently, a data carrier which is wound up on the hub of a reel and which is damaged to such an extent that natural cohesion of the spool is no longer given can be placed in the reconditioning liquid and then removed therefrom.

It can be provided according to a further development of the invention that the data carrier is suspended in the reconditioning liquid, wherein the data carrier is enclosed substantially all sides by the reconditioning liquid. Preferably, the data carrier will be suspended on an apparatus such as a hook or a U-shaped apparatus, wherein this apparatus can preferably accommodate a predeterminable number of data carriers. As a result, the data carrier can be introduced into and removed from the reconditioning liquid in a simple manner. Furthermore, a predeterminable number of data carriers can be introduced into the reconditioning liquid and removed therefrom at once. If the data carrier is wound up on reel or spool cores, a predeterminable number of such reels can especially be suspended vertically or horizontally in the reconditioning liquid at a predeterminable distance from one another.

It can further preferably be provided that the reconditioning liquid is moved in relation to the data carrier. This helps prevent any dilutions in the concentration of the plasticizer in the reconditioning liquid in the direct vicinity of the inserted data carrier. Furthermore, suspended matter and/or substances emitted from the data carrier such as acetic acid and/or old plasticizer is moved away from the direct vicinity of the data carrier.

The relative movement of the reconditioning liquid in relation to the data carrier can occur in such a way for example that a container is moved in which the reconditioning liquid and the data carrier are disposed, whereupon the reconditioning liquid will be made to move as a result of its inertia.

It can further be provided that an apparatus on which the data carrier is arranged is moved in the reconditioning liquid. The reconditioning liquid can further be moved by a stirring apparatus in the container.

Furthermore, the reconditioning liquid can be moved by a circulating pump. When using the circulating pump, the concentration of the plasticizer in the reconditioning liquid can be checked and optionally corrected. Furthermore, a filter can be used when using a circulating pump, which filter is suitable for filtering out suspended matter and/or chemicals such as acetic acid from the reconditioning liquid.

It can further be provided that the reconditioning liquid is applied by means of spraying or an aerosol mist onto the data carrier. In contrast to dipping the data carrier into the reconditioning liquid where the concentration of the plasticizer in the reconditioning liquid remains substantially constant, the application of the reconditioning liquid onto the data carrier by means of spraying or an aerosol mist will lead to the consequence that small droplets or a thin layer of the reconditioning liquid will form on the data carrier. Since the solvent in the reconditioning liquid will continuously evaporate, the concentration of the plasticizer in the droplet and/or the layer will continuously increase, as a result of which the entire plasticizer contained in the droplet and/or thin layer will be absorbed by the data carrier. As a result, the reconditioning liquid can be applied in a very careful manner onto the data carrier, wherein the plasticizer will be absorbed by the data carrier in a controllable manner.

In the case of data carriers in which the information layer and/or the carrier layer shows cracks and/or fissures as a result of the ageing process, or in which there has been a delamination of the information layer and the carrier layer at least in part, an embedding of the reconditioning liquid in the cavities can occur as a result of a capillary effect when the data carrier is sprayed with the reconditioning liquid and/or is dipped into the reconditioning liquid. Such inclusions at specific points can be disadvantageous for such a data carrier, e.g. a lacquer disc.

It can therefore be provided that the reconditioning liquid is applied by means of a sponge or a tampon onto the data carrier. The sponge or tampon will counteract the capillary effect of the fissures and/or cavities in the data carrier, thereby leading to an only very low extent of inclusions of reconditioning liquid in the data carrier.

It can be provided in a further development of the invention that the reconditioning liquid is applied for a predeterminable period of time onto the data carrier. It can preferably be provided that the data carrier, especially after the expiration of the predeterminable period of time, is removed from the reconditioning liquid.

It can especially be provided that the reconditioning liquid is applied onto the data carrier for a predeterminable period of time of at least one hour. It has been noticed that this period of time is already sufficient in order to produce an improvement in the mechanical properties and/or reproduction quality of the data carrier.

Preferably, the reconditioning liquid is applied onto the data carrier for a predeterminable duration of at least three hours, wherein the positive effects which were observed after a first duration of one hour are increased even further.

The reconditioning liquid is applied in an especially preferred way onto the data carrier for a predeterminable duration of at least five hours. It was noticed in the course of tests that when the reconditioning liquid was applied to a loose section of a data carrier for six hours the data carrier will show a higher concentration of the plasticizer. Tests have further shown that a longer application of the reconditioning liquid will increase this concentration of the plasticizer in the data carrier only to an irrelevant extent and did not lead to any negative effects. As a result, the method can also be performed by inexperienced and/or unreliable persons because an excessively long predeterminable duration, especially caused by inadvertently forgetting the data carrier in the reconditioning liquid, will not lead to any negative consequences for the data carrier.

It was also noticed within the scope of tests that it is advantageous to apply the reconditioning liquid for a longer period onto the data carrier, e.g. when the data carrier is wound up on a reel.

In a specific test, two identical data carriers wound up on a reel were dipped for six hours and eighteen hours into the reconditioning liquid. Whereas there was only a low difference in the concentration of the plasticizer for those parts of the respective data carrier which were arranged at the outer end of the reel and which were therefore subjected more strongly to the reconditioning liquid and were dipped into the reconditioning liquid for six hours and eighteen hours, the parts of the data carrier which was situated in the interior of the reel showed a distinct difference (approximately twice the amount) in the concentration of the plasticizer. The part of the data carrier which was arranged in the interior of the reel and was dipped for eighteen hours into the reconditioning liquid showed two-thirds of the concentration of the plasticizer of the two parts arranged at the outer end of the reel.

Since an equivalent effect is achieved in a partial section of a data carrier wound up on a reel, which occurs irrespective of the arrangement of this partial section of the data carrier in the reel, a data carrier wound up on a reel can be dipped completely into the reconditioning liquid without having to be unreeled. Since a data carrier which is wound up on a reel can be subjected to the method, a data carrier which is wound up on a reel can be made elastic again on the one hand and the mechanical meshing of the layers of the data carrier wound up on a reel can be released on the other hand, because the plastic content will swell up again, which enables playback or copying of the information stored on the data carrier because the treated data carrier can be unreeled in a destruction-free manner from the reel.

It can be provided in a further development of the invention that the data carrier, prior to the application of the reconditioning liquid, is subjected to a preliminary examination 1. Process parameters can thus be adjusted to the state of the data carrier, which advantageously enables a careful method in accordance with the invention for the data carrier. Furthermore, the state of the data carrier can be compared before and after the treatment by the method in accordance with the invention, thereby allowing the drawing of conclusions on the effectiveness of the treatment or on a further possible procedure.

It can be provided in a further development of the invention that prior to the application of the reconditioning liquid a degree of damage of the data carrier will be determined. This allows adjusting the further procedure of the method to the degree of damage of the data carrier, thus allowing the achievement of a careful but effective treatment of the data carrier.

It can be provided according to a further embodiment of the invention that for determining the degree of damage at least one test of a mechanical property is performed on at least one sample of the data carrier to be treated. Consequently, the elasticity and/or the extensibility can thus be determined for example and conclusions can be drawn on the concentration of the plasticizer in the data carrier.

In a preferred embodiment of the invention, the degree of damage of the data carrier will be determined by means of at least one tensile test because the tensile test is a recognized, standardized and inexpensive testing method. Furthermore, the tensile test allows drawing conclusions on the degree of damage of the data carrier.

It can be provided according to a further preferred embodiment of the invention that the mechanical properties are determined by means of a dynamic mechanical analysis or a dynamic mechanical-thermal analysis, which are also known as DMA or DMTA. This allows determining the elasticity of the data carrier and therefore the degree of damage.

It can be provided according to another embodiment of the invention that a part of the data carrier to be treated is examined within the scope of the preliminary examination 1 by means of gas chromatography, especially by means of a thermodesorption examination, wherein the various plasticizers in the data carrier and their concentration can be determined. As a result, the composition of the reconditioning liquid which is applied to the examined data carrier can be adjusted in a better way to this data carrier.

It can be provided in a further development of the invention that for determining the degree of damage a visual evaluation of the condition of the data carrier will be performed. A skilled person can recognize the degree of damage of the data carrier by means of optical device for example, especially a microscope and/or a magnifying glass. It is determined for example how well the information layer still adheres to the carrier layer. Furthermore, the state of the data carrier can preferably be determined in a visual way, preferably by means of a camera and/or scanner, and can be digitized. The further evaluation can occur by means of image processing software which is capable of evaluating the signs in a quantitative manner, e.g. the plasticizers that have seeped to the surface of the data carrier and/or the bulging of the data carrier. A visual evaluation of the condition can also occur by means of infrared spectroscopy. This allows adjusting the further method steps to the degree of damage of the data carrier, by means of which the method in accordance with the invention can be adjusted even better to the actual state of the data carrier. Furthermore, this test method can be performed in a contact-free and destruction-free manner.

It can be provided in a further embodiment of the invention that for determining the degree of damage the quality of the reproduced information will be determined on at least one sample of the data carrier. The quality of the reproduced information can preferably be determined in this process by the reproduction quality of high-frequency content such as the harmonics in sound recordings and/or fine image details in photographic contents. The state of the information stored on the data carrier, whose reproduction will be improved by the method in accordance with the invention, can be determined prior to performing the method, as a result of which the process parameters for the quantity that will be of interest in the end can be optimized.

It can be provided in a further embodiment of the invention that the predeterminable duration is determined on the basis of the degree of damage of the data carrier. A short duration can thus be chosen. As a result, larger archives of data carriers can be treated in the shortest possible time in which the desired effect of the method in accordance with the invention will still occur. This is advantageous because larger archives of data carriers require a respectively longer total duration for performing the method in accordance with the invention.

In the case of a large archive of data carriers, the predeterminable duration of the method in accordance with the invention can be optimized empirically by means of a test series to the extent that the data carriers of the archives have the same degree of damage.

It can be provided in a further development of the invention that in the determination of the predeterminable duration the temperature of the reconditioning liquid will be taken into account. As a result, the predeterminable duration can be reduced even further by controlling the temperature of the reconditioning liquid. If the process configuration does not allow any control of the temperature, the predeterminable duration can thus be adjusted to the ambient temperature by a determination of the ambient temperature which is in thermodynamic equilibrium with the temperature of the reconditioning liquid after a transient process.

It can be provided in a further embodiment of the invention that after the application of the reconditioning liquid any excess plasticizer will be removed from the data carrier, especially by substantially pure solvent. This can occur in such a way that the data carrier, after the treatment with the reconditioning liquid, is drawn over a fabric impregnated with a washing substance. Furthermore, the data carrier can also be moved back and forth for a second predeterminable period of time in the washing substance. Liquids can preferably be used as washing substances which are also suitable as solvents. As a result, any excess plasticizer will be removed from the surface of the data carrier and any undesirable further reaction will be prevented. This washing process 3 can also be a combination of the above acts.

It can be provided in a further development of the invention that the data carrier, after the application of the reconditioning liquid, is wound off from a first reel and is wound up on a second reel. This improves the flexibility of the data carrier and therefore the quality of the reproduction of the stored information. This unreeling from the first reel with subsequent winding up on the second reel will also be known below as rewinding process 4 and can also occur several times. A predeterminable mechanical deflection of the data carrier can also be provided in this process.

Furthermore, the data carrier can also be rewound in the washing substance, so that both processes can occur simultaneously.

It can be provided in a further development of the invention that the data carrier will be dried after the application of the reconditioning liquid. This process, which will be referred to below as drying process 5, can occur by means of a fan or a drying apparatus, or by placing the data carrier in a well-ventilated environment. This prevents the contamination the data carrier by fungi, bacteria or other microorganisms, as a result of which the data carrier and the irreplaceable and valuable cultural assets contained thereon can be stored for a long period of time again after the treatment.

It can be provided in a further embodiment of the invention that further additives such as biocides are added to the reconditioning liquid. This further prevents the contamination of the data carrier by fungi, bacteria or other microorganisms. Further additives can be substances which impregnate and/or seal the data carrier in order to protect it sustainably.

BRIEF DESCRIPTION OF THE DRAWING

The only drawing shows an especially preferred embodiment of the method, which will be described below by reference to the specific application of an aged audio tape of type AGFA WOLFEN TYPE 100.

DETAILED DESCRIPTION OF PREFERRED EMBODIMENTS

In this especially preferred embodiment of the method, the data carrier will be subjected to a preliminary examination 1 in a first method step.

This preliminary examination 1 comprises visual inspection for the purpose of evaluating the degree of damage and an examination of the quality of the reproduction of the information by means of a sonogram. Furthermore, a tensile test can be performed for determining the extensibility and the elasticity of the data carrier, or a gas-chromatographic examination for determining the plasticizers contained in the data carrier.

In this preferred embodiment, a dipping bath is filled with a reconditioning liquid consisting of 2% by volume of Di-2-ethyl hexyl phthalate as the plasticizer and 98% by volume of Shellsol D40 as the solvent. The dipping bath is at room temperature, preferably approximately 20° C.

The predeterminable duration is 6 hours when the data carrier is not wound up on a reel, and 18 hours when the data carrier is wound up on a reel.

Subsequently, the data carrier will be inserted in a dipping process 2 into the prepared dipping bath for the predetermined duration.

The dipping bath contains a grating at the bottom on which the data carrier will be placed, so that it is enclosed completely by the reconditioning liquid.

In this especially preferred embodiment of the method, the data carrier will be subjected to a washing process 3 after the removal from the dipping bath, wherein the data carrier will be moved back and forth in Shellsol D40.

Subsequently, the data carrier which is wound up on a reel will be subjected to a rewinding process 4 in this especially preferred embodiment of the method. This rewinding process 4 can also be combined with the washing process 3.

The data carrier will be dried by a fan as the last method step in this especially preferred embodiment of the method.

In the aforementioned specific example, the Di-2-ethyl hexyl phthalate content in the data carrier can be increased by 200 times by the first preferred embodiment of the method and the extensibility can be increased from approximately 10% to approximately 17%. Furthermore, the sound quality of the audio tape will be improved considerably, wherein especially the harmonics will become more distinct and background noise will become more constant and therefore less irritating.

Further embodiments in accordance with the invention merely comprise a part of the described features, wherein any combination of features can be provided, which also includes such of different described embodiments.

What is claimed is:

1. A method for reconditioning data carriers having a plastic content, comprising:
applying a reconditioning liquid in liquid phase to the data carrier for at least one hour by completely immersing the data carrier into the reconditioning liquid while the data carrier is wound up on a reel, said the reconditioning liquid comprising a solvent and at least one non-volatile plasticizer, said solvent being substantially inert in relation to the data carrier so as to not enter into any chemical compound with the data carrier, and not diffusing into the data carrier and not swelling the data carrier, wherein a concentration of the plasticizer in the reconditioning liquid is such that a gradient of change in volume of the data carrier is positive as a result of an exchange of the plasticizer with the reconditioning liquid, and wherein the solvent has a flash point below 70° C., wherein the solvent consists of saturated hydrocarbons.

2. The method of claim 1, wherein the plasticizer is homogeneously miscible with the solvent.

3. The method of claim 1, wherein the reconditioning liquid is moved in relation to the data carrier.

4. The method of claim 1, wherein the reconditioning liquid is applied to the data carrier for a predeterminable duration of at least three hours.

5. The method of claim 1, wherein the reconditioning liquid is applied to the data carrier for a predeterminable duration of at least five hours.

6. The method of claim 1, wherein said predeterminable duration is determined as a function of a degree of damage of the data carrier.

7. The method of claim 1, further comprising drying the data carrier after application of the reconditioning liquid.

8. The method of claim 1, further comprising removing any excess plasticizer from the data carrier after the application of the reconditioning liquid.

9. The method of claim 8, wherein the excess plasticizer is removed from the data carrier by a substantially pure solvent.

10. The method of claim 1, further comprising adding further additives to the reconditioning liquid.

11. The method of claim 10, wherein the further additives include biocides.

12. The method of claim 1, wherein a tape material is used as the data carrier.

13. The method of claim 12, wherein the tape material has an information layer comprising magnetizable particles.

14. The method of claim 1, wherein the solvent is a non-explosive solvent.

15. The method of claim 1, wherein dearomatized hydrocarbons are used as the solvent.

16. The method of claim 1, wherein the solvent is a non-toxic solvent.

* * * * *